US011531957B2

(12) United States Patent
Padgett et al.

(10) Patent No.: US 11,531,957 B2
(45) Date of Patent: Dec. 20, 2022

(54) CARGO MANAGEMENT SYSTEM AND METHODS OF MANAGING CARGO

(71) Applicant: Flexport, Inc., San Francisco, CA (US)

(72) Inventors: Zoe Padgett, San Francisco, CA (US); Phoebe Rockwood Ford, San Francisco, CA (US); Emily Cutts Worthington, Oakland, CA (US)

(73) Assignee: FLEXPORT, INC., San Francisco, CA (US)

( * ) Notice: Subject to any disclaimer, the term of this patent is extended or adjusted under 35 U.S.C. 154(b) by 881 days.

(21) Appl. No.: 16/370,112

(22) Filed: Mar. 29, 2019

(65) Prior Publication Data
US 2019/0303847 A1 Oct. 3, 2019

Related U.S. Application Data

(60) Provisional application No. 62/650,866, filed on Mar. 30, 2018.

(51) Int. Cl.
*G06F 7/00* (2006.01)
*G06Q 10/08* (2012.01)
*G06K 17/00* (2006.01)
*G06F 16/28* (2019.01)
*G06F 3/04817* (2022.01)
*G06Q 50/10* (2012.01)

(52) U.S. Cl.
CPC ....... *G06Q 10/087* (2013.01); *G06F 3/04817* (2013.01); *G06F 16/285* (2019.01); *G06K 17/0016* (2013.01); *G06Q 10/0832* (2013.01); *G06Q 50/10* (2013.01)

(58) Field of Classification Search
CPC .. G06Q 10/087; G06Q 10/0832; G06Q 50/10; G06F 3/04817; G06F 16/285; G06K 17/0016
See application file for complete search history.

(56) References Cited

U.S. PATENT DOCUMENTS

| 2002/0130065 A1* | 9/2002 | Bloom | B07C 3/00 209/630 |
| 2002/0178074 A1* | 11/2002 | Bloom | G06Q 20/00 705/26.81 |
| 2006/0020366 A1* | 1/2006 | Bloom | G06Q 20/00 700/226 |

FOREIGN PATENT DOCUMENTS

| JP | 3766587 B2 | * | 4/2006 |
| JP | 3827283 B2 | * | 9/2006 |

* cited by examiner

*Primary Examiner* — Talia F Crawley
(74) *Attorney, Agent, or Firm* — Hickman Becker Bingham Ledesma LLP; Edward A. Becker

(57) ABSTRACT

In an embodiment, the methods and systems disclosed herein utilize a cloud-based service to accept measurements of commercial objects for storage in a database. In an embodiment, commercial objects are automatically grouped based on measured physical characteristics. In an embodiment, a build plan is generated to utilize the maximum amount of space possible in a shipping container based on the grouped commercial objects.

20 Claims, 10 Drawing Sheets

Package Database 110

| Serial | Dimensions | Weight | Symbol |
|---|---|---|---|
| #1234 | 1.2x.53x.31 | 52 | New |
| #1235 | 1.4x1.4x.22 | 35 | New |
| #1236 | 1.2x.52x.32 | 81 |  |
| #1237 | 1.2x.52x.32 | 72 | NA |
| #1242 | .6x.5x.5 | 07 | New |
| #1243 | .6x.5x.5 | 07 | New |
| #1244 | 1.4x1.4x.21 | 33 |  |
| #1271 | 1.0x1.0x.22 | 33 | NA |

Package Database 110

| Serial | Dimensions | Weight | Symbol |
|---|---|---|---|
| #1234 | 1.2x.53x.31 | 52 |  |
| #1235 | 1.4x1.4x.22 | 35 |  |
| #1236 | 1.2x.52x.32 | 81 |  |
| #1237 | 1.2x.52x.32 | 72 |  |
| #1242 | .6x.5x.5 | 07 |  |
| #1243 | .6x.5x.5 | 07 |  |
| #1244 | 1.4x1.4x.21 | 33 |  |
| #1271 | 1.0x1.0x.22 | 33 |  |

CARGO MANAGEMENT SYSTEM AND METHODS OF MANAGING CARGO

BENEFIT CLAIM

This application claims the benefit under 35 U.S.C. § 119(e) of provisional application 62/650,866 filed Mar. 30, 2018, the entire contents of which is hereby incorporated by reference for all purposes as if fully set forth herein.

TECHNICAL FIELD

One technical field of the present disclosure is freight shipping and management. Another technical field is computer systems for data collection, grouping, and optimization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Items in commerce are any items, objects, products, work-product, or tools which are transported from one location to another as part of a commercial transaction or contract. The modern freight shipping industry involves transporting copious amounts of items and products to and from various locations around the world and often across numerous borders. As a result, modern shipping processes must track and manage large amounts of logistical information and physical objects in order to efficiently and accurately transport those objects from one location to another.

Numerous labor and technology intensive operations occur before, during, and after an item is shipped commercially. Multiple intermediary steps are taken between the time that a commercial shipment leaves an origin point and reaches its destination point. For example, an item may arrive at a warehouse or management facility from the origin point before it can be delivered to the destination point. Processing items at a warehouse or management facility may involve multiple steps, including at least unloading items from a transportation container, measuring various characteristics of an item, storing the items physically, storing information about the items electronically, and loading the items into transportation containers for transport to a final customer destination.

Technology currently used in warehousing and management facility operations often requires warehouse managers to make personal decisions regarding the best practices for processing operations inside a warehouse or facility. The modern shipping industry constantly processes a very high amount of commercial package volume, and the numbers continue to grow daily.

If a single processing operation out of the many required is done incorrectly, the entire supply chain in a commercial transaction is put at risk. Human error often occurs when a human manager or operator attempts to guess aspects of a package, such as size, weight, where to store the package, where to ship the package, or how to store the package. Computer-readable labels on the packages which cannot be interpreted by humans cause such guesswork to occur, resulting in the potentially costly possibility of major human error. When those errors affect the supply line, there is a slowing of other incidental processes, resulting in costly mistakes, slow-downs, and cancellations of commercial shipping orders.

If human operators attempt to skirt this problem by carefully checking each package for details, the supply chain runs slowly, sacrificing crucial efficiency and logistic goals to prevent such errors, which can be a costly practice in the modern shipping field. The high volume of commercial items processed at a management facility means that the steps of processing the items must proceed as efficiently as possible. Therefore, there exists a need in the field of commercial item management for a system to improve the management of commercial items at a commercial facility by efficiently and accurately tracking and grouping commercial items for transport and storage, while presenting clear and intuitive instructions for human-based tasks at the warehousing and management facility operations levels.

SUMMARY

The appended claims may serve as a summary of the invention.

DETAILED DESCRIPTION

Figure 1:
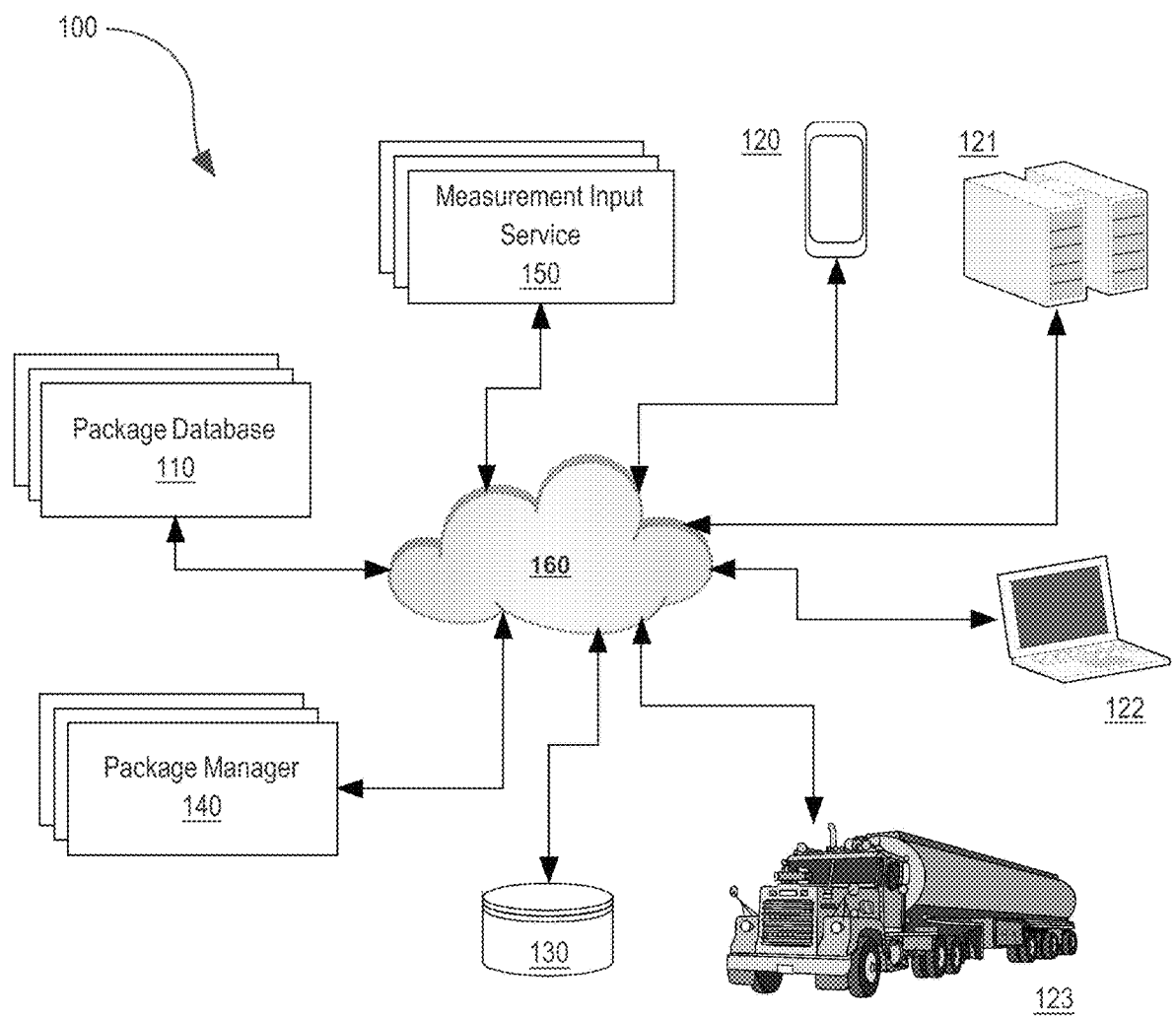
FIG. 1 depicts a system that may be used to implement an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In various embodiments of the techniques herein, a computer implemented method is used to input and/or collect data on the physical properties of commercial items ("packages") arriving at a management facility. Embodiments are described herein in the context of packages for purposes of explanation, but embodiments are not limited to packages per se, and are applicable to any item of commerce. The information is measured with the help of a human operation and the information is provided via an electronic device which logs crucial aspects of a package's physical properties, such as the package's three cardinal dimensional measures and/or the package's weight.

The information input is sent to a cloud-based service which has access to information about all packages at the management facility. The cloud-based service may store the input in a package database. The cloud-based service may access to the package database regularly to store, interpret and modify the information regarding the physical packages stored at the management facility.

Grouping of packages with similar physical properties will allow more efficient storage and cargo shipping practices. As used herein, the term "grouping" refers to establishing an association or designation among packages for the purpose of shipping packages together. For efficient grouping of physical packages, the cloud-based service groups packages having like physical properties into designated groups. As used herein, the terms "groupings," "groups," and "designated groups" are used synonymously. The designated groups allow human users to more easily physically stack and manipulate the packages in the management facility. In order to make the groups instantaneously discernable to humans, the cloud-based service associates, with each designated group, a picture, symbol or image which is easily recognizable to a human being. In furtherance of ease of recognition, the cloud-based service may additionally associate, with each designated group, an additional computer-readable code which allows a computer to scan, recognize, or otherwise quickly associate a piece of information with the designated group.

The designated groups formed by the cloud-based service function to store the packages within the management facility and prepare the packages for shipment out of the management facility while maximizing the utilized space in a warehouse or management facility. In many cases, shipment of packages requires the placement of outgoing packages in a storage container for physical transportation. In order to maximize the utilized space in a storage container used for shipping, the cloud-based service generates a build plan, also referred to herein as a "package build plan." A build plan is a set of instructions, diagrams, or lists which specifies the order, arrangement, and/or time that a designated group, or subset of a designated group of packages, will be placed in the storage container for commercial shipping.

The build plan specifies the manner in which packages are placed into a storage container. To aid in other processes incidental to commercial shipping, the build plan may be relayed to third-parties operating outside of the warehouse or management facility. For example, a delivery driver handling the storage container during transportation may receive a copy of the build plan to convey the designated groups that packages are placed in and the arrangement of those designated groups in the storage container. Alternatively, or in addition, a build plan may be relayed to a customer or carrier who is responsible for unpacking and handling the packages after their arrival at a separate management facility for similar reasons. The build plan may be saved for future use at the management facility, or optimized/modified for future use to further improve efficient placement or packages or grouping of packages in designated groups.

System Implementation

FIG. 1 depicts an example system 100 for the generation of shipping plans. Network 160 connects devices and systems 110-150. Network 160 may be any appropriate local area network, internet, intranet, and/or other type of network or communication mechanism capable of facilitating communication between electronic entities, including those discussed herein. Network 160 may allow the facilitation of a cloud-based service which uses devices, systems, and services 110-150 to measure, store, and generate build plans related to, package information.

Coupled to network 160 is package database 110. Package database 110 may be any device, system, or entity which is capable of storing information related to packages. In various embodiments, package database 110 is one or more computing devices or servers utilizing database software to collectively track, store, and make available information related to packages.

Package manager 140 is connected to network 160. Package manager 140 may be any device, system, cloud-based program, or entity capable of facilitating measurement of, storage of, grouping of, or generation of build plans related to, package data. In various embodiments, package manager 140 communicates directly with package database 110 to utilize, modify, add or delete information from package database 110.

Measurement input service 150 is connected to network 160. Measurement input service 150 may be any device, system, or entity capable of accepting, inputting, receiving, or facilitating information related to measurement of physical properties of packages. In various embodiments, measurement input service 150 is present on a user device and receives information from a user regarding measured physical properties of a package. In various further embodiments, measurement input service sends received user input to package manager 140 or package database 110 to store therein.

Devices 120-123 are connected to network 160. Devices 120-123 may be any device, system, or entity which may further aid in the measurement, storage, grouping, or generation of a build plan relating to package data. For example, device 120 may be a smartphone employed by a management facility employee utilizing measurement input service 150 to measure and sent information over network 160. Device 121 may be a series of servers or computing devices which store, for access, various data, such as data included in package database 110. In an additional example, device 121 may be a series of servers which host cloud-based services such as package manager 140. Device 122 may be a personal computing device installed at a management facility to aid in the processing of packages at the facility. Commercial vehicle 123 may be a commercial vehicle including built-in technology or connectivity devices which can communicate over network 160.

Storage 130 is connected to network 160. Storage 130 may be any storage device, software, application, or entity which is capable of storing digital information. In various embodiments, storage 130 may replace any other entity in example system 100 which allows the storage of digital information. In various embodiments, the example system 100 as described herein executes the steps of process 200 in FIG. 2.

Process Overview

Figure 2:
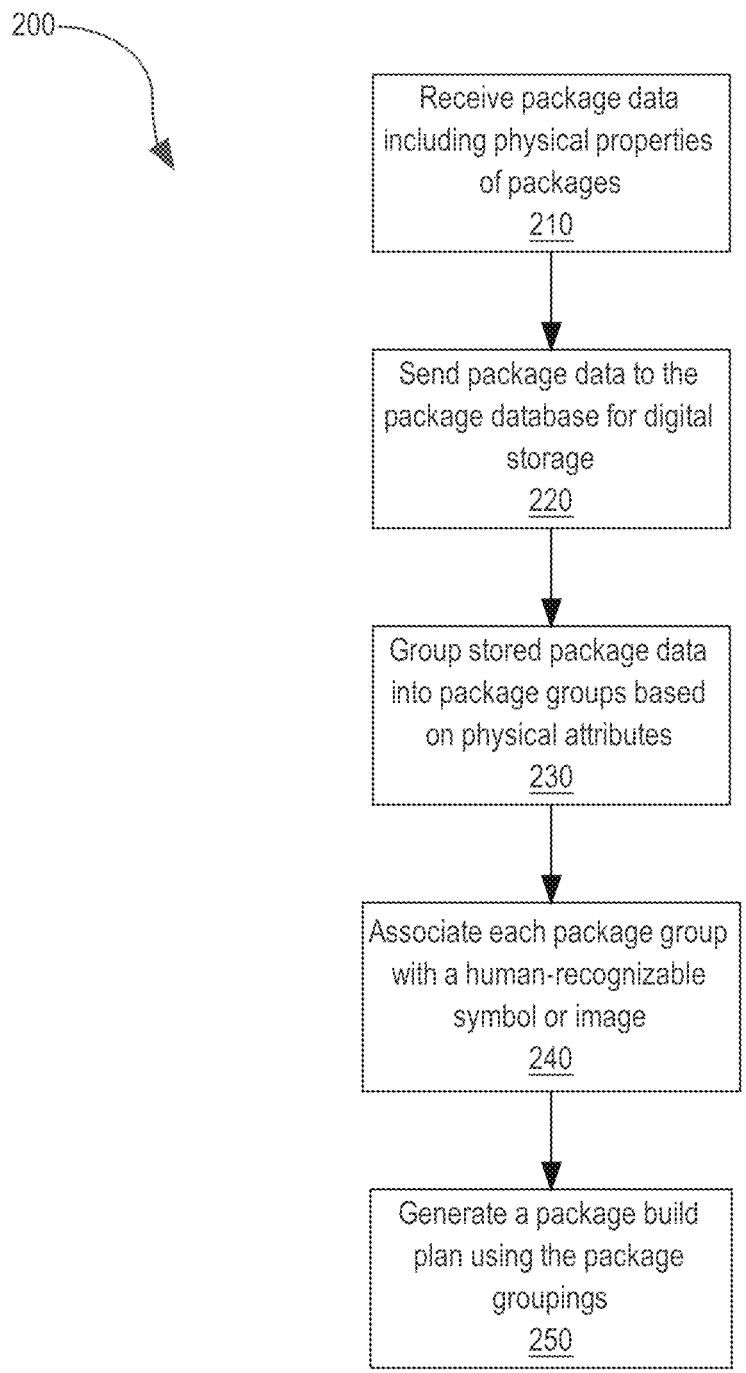
FIG. 2 depicts an example process that may govern the operation of an embodiment.

FIG. 2 depicts an example process 200 that may govern operation of an embodiment. Process 200 begins with receiving 210 package data including physical properties of packages. Received package data is then sent 220 to the package database for digital storage. Based on the physical attributes stored in the database, stored package data is grouped 230 into package groups. Each group is associated 240 with a human-recognizable symbol. Once all groups are associated with a symbol or image, a build plan is generated 250 using the groupings.

Returning to step 210, package data including the physical properties of packages is received. The packages may be any number of packages for which measurement must be obtained in order to facilitate grouping of the packages in step 230. For example, the packages may be objects which have recently arrived at a management facility and for which there is no corresponding package data stored in the package database 110. In various embodiments, receiving package data may comprise manually measuring, by a human, the dimensions, weight, or any other physical property of a package, which the human will then input as values into measurement input service 150 via a device 120-123. In various embodiments, package data is measured by a separate computer system to approximate the physical properties of a package. A computer system measurement of a package may be used to supplement a manual measurement by a human or vice-versa. In various embodiments, an optical scanning system is the computer system which may automatically take measurements of a package, and may further automatically transmit package data including the measurements to package manager 140 or package database 110.

In various embodiments, receiving package data may comprise receiving existing package data from a source, such as a previous management facility or supplier. For example, a previous management facility may have stored, on a separate database accessible by example system 100, package data relating to physical properties of a number of packages. In lieu of measuring the packages at the management facility, the package data may be forwarded directly to the package database 110 or package manager 140 from the separate database. In various further embodiments, receiving package data may occur in response to scanning or inputting a symbol or label which indicates that the existing package data should be obtained. For example, a QUICK RESPONSE CODE may be generated corresponding to the physical properties of a package stored at a separate database. Scanning the QUICK RESPONSE CODE by an input device 120-123 may create an indication to example system 100 that the existing package data associated with the code should be obtained from the separate database. In various further embodiments, a human operator may recognize a human-recognizable symbol on an arriving package and input the symbol into a user device, causing the auto-generation of package data.

Package data may be any data relating to the physical properties of a package, including but not limited to, height, width, length, weight, density, shape, contents, content fragility, packaging material, durability, geographical origin, geographical destination, miles travelled, or time of packaging.

At step 220, the received package data is sent to the package database 110 for digital storage. The package data may be to package database 110 through any means capable of sending package data, including over network 160. In various embodiments, package data is sent from the measurement input system 150 to package manager 140 before being forwarded to the package database 110. In various further embodiments, upon receiving package data from measurement input system 150, package manager 140 may perform an integrity check to determine whether the received package data is fit to be stored in package database 110. In various embodiments, any of the measurement input service 150, the package manager 140 and the package database 110 may be programs or services running on a singular or separate device(s) alone or in combination.

Upon receiving the sent package data, the package database may store, in an internal memory or external memory, including storage 130, the package data. The package data may be stored as digital data relating having values corresponding to the physical properties of a package. In various embodiments, the package database, in additional to storing the received package data, may also store any number of existing package data from previous iterations of process 200 or any other process which sends package data to the package database 110. For example, a package database 110 may store package data relating to newly arrived packages at a management facility as well as package data relating to packages that have been stored at the management facility for a length of time longer than the newly arrived packages.

At step 230, the stored package data is grouped into package groups based on the physical properties of the packages comprising the package data. Grouping of the packages may comprise an electronic indication that the packages are in a group, a physical indication that the packages are in a group, or any other means to group packages into package groups. In various embodiments, grouping of packages is based on the physical properties of packages relating to elements of mass and volume of a package. For example, packages may be placed in a group based on the measured mass and volume that a package comprises in physical space.

The grouping of packages may be such that packages with like physical properties are grouped with other packages having like physical properties. For example, two packages having the same dimensionally measured values and weight may be grouped together in the same package group. In various embodiments, grouping occurs based on a standard deviation of physical properties of packages. For example, packages having a measured length value within 1% of the average length value of a group may be grouped in that package group despite not having precisely the same length value.

In various embodiments, grouping of packages may further comprising placing grouped packages in proximity of each other in physical space in the warehouse or management facility. For example, packages having like dimensions and grouped together may be moved together to a section of the warehouse or management facility to group them together in physical space. In various embodiments, grouping is accomplished by creating an electronic indication that the packages are grouped. For example, package data relating to grouped packages may be placed in a local file an electronic storage to indicate that the packages corresponding to the package data are grouped.

At step 240, a human-recognizable symbol or image is associated with each package group. A human-recognizable symbol may be any image, symbol, character, emoji, silhouette, or other graphical representation such that a human can immediately view and recognize the content and/or design of the symbol. In various embodiments, a human-recognizable symbol is assigned to each distinct package group to allow a human to easily differentiate an individual package group from all other package groups.

In various embodiments, a human-recognizable symbol is chosen from a group of human-recognizable symbols stored on the package database 110 or the package manager 140 to represent an individual package group. In various embodiments, a human-recognizable symbol is chosen randomly to be associated with a package group. In various embodiments, a human-recognizable symbol is chosen to be associated with a package group based on the contents of packages in a package group. For example, if all packages in a package group contain designer shoes, package manager 140 may select an emoji or digital symbol resembling a stiletto heel shoe to be associated with the package group.

In various embodiments, a human-recognizable symbol is chosen to be associated with a package group based on the original or destination of a package group. For example, if all packages in a package group have a point of origin in Miami, Fla., an emoji representing a shining sun may be associated with the package group. As a further example, if all packages in a package group have a point of destination in Beaver Dam, Wis., an emoji representing a snowflake may be associated with the package group. Packages may have multiple emoji's that represent, for example, a single piece of information such as a point of origination or a point of destination, or multiple pieces of information, such as a point of origination, a point of destination, contents or characteristics to the package.

In various embodiments, a human-recognizable symbol is chosen to be associated with a package group based on similar physical properties of the packages in the package group. For example, if each package in a package group has a measured height value relatively out of proportion with measured length and width values, a giraffe emoji may be associated with the package group. As a further example, if all packages in a package group are disproportionately heavy compared to the average measured weight values of other packages groups, an elephant emoji may be associated with the package group.

In various embodiments, example system 100 may refer to package groups by a human-recognizable symbol associated with the package group. For example, a package manager may store a human-recognizable symbol associated with a package group for conveying the existence of a package group in a warehouse or management facility. For example, a human operator inquiring about the contents of a warehouse or management facility may input an inquiry to the package manager 140 regarding inventory. The package manager 140 may communicate with the package database and return to the operator an inventory list specifying the groups and package amounts in each group in terms such as "elephant group—23 packages, stiletto group—14 packages," etc.

At step 250 a package build plan is generated using the package groups. A package build plan may specify an arrangement of physical packages or package groups in a predetermined physical volume. For example, in response to a request to fill a storage container with packages for transport, package manager 140 may determine the size of the shipping container and generate a build plan for physically placing the packages in the storage container. A build plan may be any set of instructions, visual display, mapping, list, or other data item which is capable of specifying an arrangement of packages in a physical volume.

In various embodiments, a build plan is designed to maximum the utilized area of a predetermined volume for package storage. For example, the package manager 140 may utilize package data from the package database 110 to optimally arrange a set of packages with as little unused room as possible. In various embodiments, package manager 140 receives a preliminary build manifest specifying a subset of packages which must be placed in the predetermined volume. In various further embodiments, a preliminary build manifest may specify individual packages, package groups, and/or subsets of package groups which must be placed in the predetermined volume. For example, a preliminary build manifest may be sent to package manager 140 specifying that a shipment in a 2.5 meter by 2.5 meter by 12 meter storage container should container at least three "elephant group packages" and at least 2 "hat packages." The package manager 140 will then generate a build plan adhering to the specifications of the preliminary build manifest while optimizing space for use in the 2.5 meter by 2.5 meter by 12 meter storage container.

In various embodiments generating a build plan may comprise adhering to a set of predetermined tolerance metrics. For example, the tolerance metrics may require that all generated build plans leave at least 2% of the edges of a shipping container empty to facilitate easier physical storage of packages. As a result, the generated build plan will optimize an arrangement of packages while leaving at least 2% of the edges of a shipping container unused for this purpose. As another example, the tolerance metrics may specify a maximum weight for a shipping container. In this example, the build plan will ensure that the maximum weight is not exceeded for a shipping container, which may be container-specific.

In various embodiments, a build plan is used to determine an arrangement of packages or package groups in the warehouse or management facility itself to maximize the efficient storage of packages and package groups therein.

In various embodiments not pictured in FIG. 2, the package manager may dynamically adjust the build plan based on one or more inputs or changes to the information comprising the build plan. For example, a human operator may specify at an input device 120-123 that a group of packages or subset of packages must be excluded from a generated build plan. For example, a user may identify defects in a group of packages which render them unfit for commercial shipping. As a result, the package manager 140 will dynamically readjust the build plan based on the user input and re-generate the build plan to exclude the unfit packages in the updated build plan.

In various embodiments regenerating a build plan may be done by the package manager 140 dynamically in response to an indication that an alternative package or package group should be substituted for a package or package group currently included in the build plan. For example, an indication may be made to package manager 140 that a group of packages included in the build plan have not arrived at the warehouse or management facility and therefore cannot be shipping commercially according to time constraints. As a result, package manager 140 may dynamically re-generate the build plan to include the alternative package or group of packages in place of the unavailable group of packages.

In various embodiments, re-generating a build plan may be done by the package manager dynamically in response to determining that unutilized space in a predetermined volume may be filled by a package or group of packages having package data stored in the package database 110. For example, a build plan utilizing 97% of a predetermined volume still have 3% of unused volume for additional packages. In response to determining that a new package or group of packages having package data stored in the package database 110 take up 3% or less of the predetermined volume, the package manager 140 may automatically re-generate the build plan to include the new package or group of packages.

In various embodiments not pictured in FIG. 2, the build plan may be shared with one or more third party entities outside of the warehouse or management facility. For example, the build plan may be shared with a delivery driver having a shipping container in which packages will be arranged according to a build plan. As a further example, a customer or destination entity may receive to build to in order to determine the most efficient way to unpack packages stored in a shipping container according to the build plan. In various embodiments, previous utilized build plans are retained by example system 100 for further analysis in order to optimize future build plans. For example, a preferable build plan according to a human operator may be given deference over a less preferred build plan when generating build plans. In various embodiments, the package manager 140 analyses efficiency and optimization metrics associated with generated build plans to generate more efficient and optimized build plans in the future.

Figure 4:
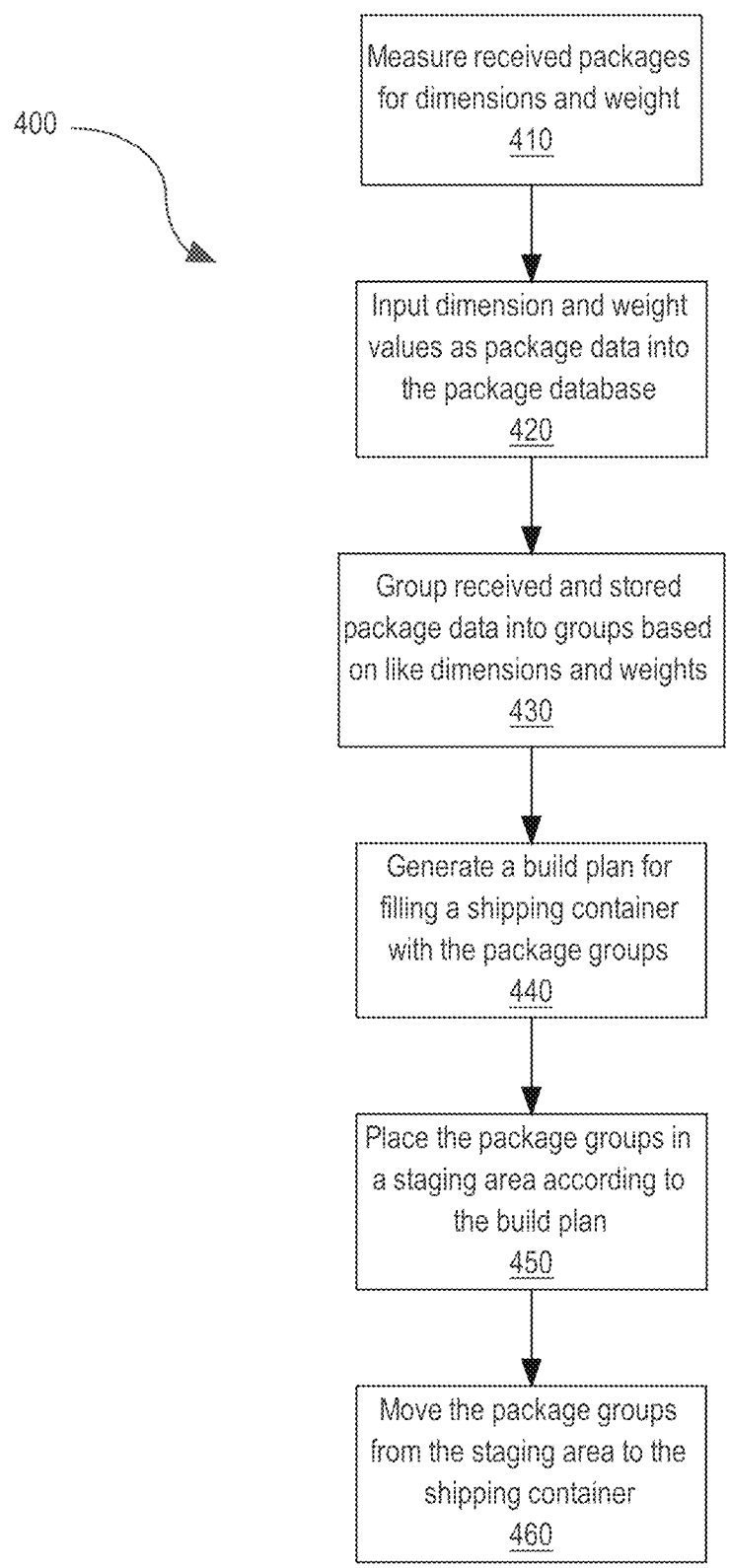
FIG. 4 depicts an example process that may govern the operation of an embodiment.

FIG. 4 depicts an example process 400 that may govern operation of an embodiment. Process 400 builds on process 200 by including dimensional and weight measurement input and a staging area for the build plan. Process 400 begins by measuring 410 received packages to determine the dimensions and weight of each received package. The measured dimension and weight values are then input 420 as package data into the package database 110. Grouping 430 of the packages based on package data is performed by comparing like dimension and weight values for the package data. A build plan is generated 440 for filling a shipping container with the package groups. The packages comprising the package groups in the build plan are placed 450 in a staging area according to the build plan. Once in the staging area, the package groups are moved 460 to the shipping container for final commercial shipping.

Returning to step 410, received packages are each measured to determine the dimensions and weight of each package. Step 410 may be similar to step 210 or different. Dimension and weight measurements may be the minimum measurements required for package manager 140 to store package data, group packages into package groups, and/or generate a build plan for an arrangement of the packages.

At step 420, the dimensions and weight of each package are input into the package database. Step 420 may be similar to step 220 or different. An input may be any input which allows the dimensions and weight values of a package to be placed into the package database. For example, a user utilizing a mobile app may input measured values of dimension and weight into a mobile application running on a user device 120 and based on the cloud-based service. In various embodiments, in response to measuring 410 the dimension and weight values of a package, a computer system may automatically send the measured values to the package database 110 or package manager 140.

At step 430, the package data is grouped into package groups based on the measured dimension and weight values. Step 430 may be similar to step 230 or different. As discussed above, the grouping of packages into package groups may be based on any physical characteristic of the packages in the package group. In various embodiments, grouping of packages is based on the dimension and weight values of a package.

At step 440, a build plan is generated to fill a shipping container with several package groups. Step 440 may be similar to step 250 or different. The build plan generated may be designed to arrange packages in a manner consistent with a fixed volume shipping container, as discussed above. In various embodiments, the shipping container is any object having a fixed volume which can fit inside of it one or more packages. Examples of shipping containers include, but are not limited to, truck containers, car trunks, package delivery vehicles, airplane cargo holds, ship cargo holds, etc.

At step 450, the package groups specified in the build plan are placed in a staging area according to the build plan. A staging area may be any predetermined area which mimics the fixed volume of a shipping container for the purposes of "staging" the arrangement of packages according to the build plan. For example, a staging area may be an open area of a warehouse or management facility having a subset of volume similar to that of the shipping container. Human operators may place the package groups in the staging area to ensure that the build plan is accurate and feasible before moving the packages to the shipping container.

At step 460, the packages in the staging area are moved to the shipping container for final commercial shipping. Movement of the package groups from the staging area to the shipping container may comprise any method or process which physically moves the packages in a staging area to a shipping container. In various embodiments, human operators rely on the human-recognizable symbols to accurately move the package groups manually from the staging area to the shipping container. In various embodiments, computer systems utilizing machines which may physically interact with packages in the staging area may move the package groups from the staging area to the shipping container.

Example Embodiments

Figure 5:
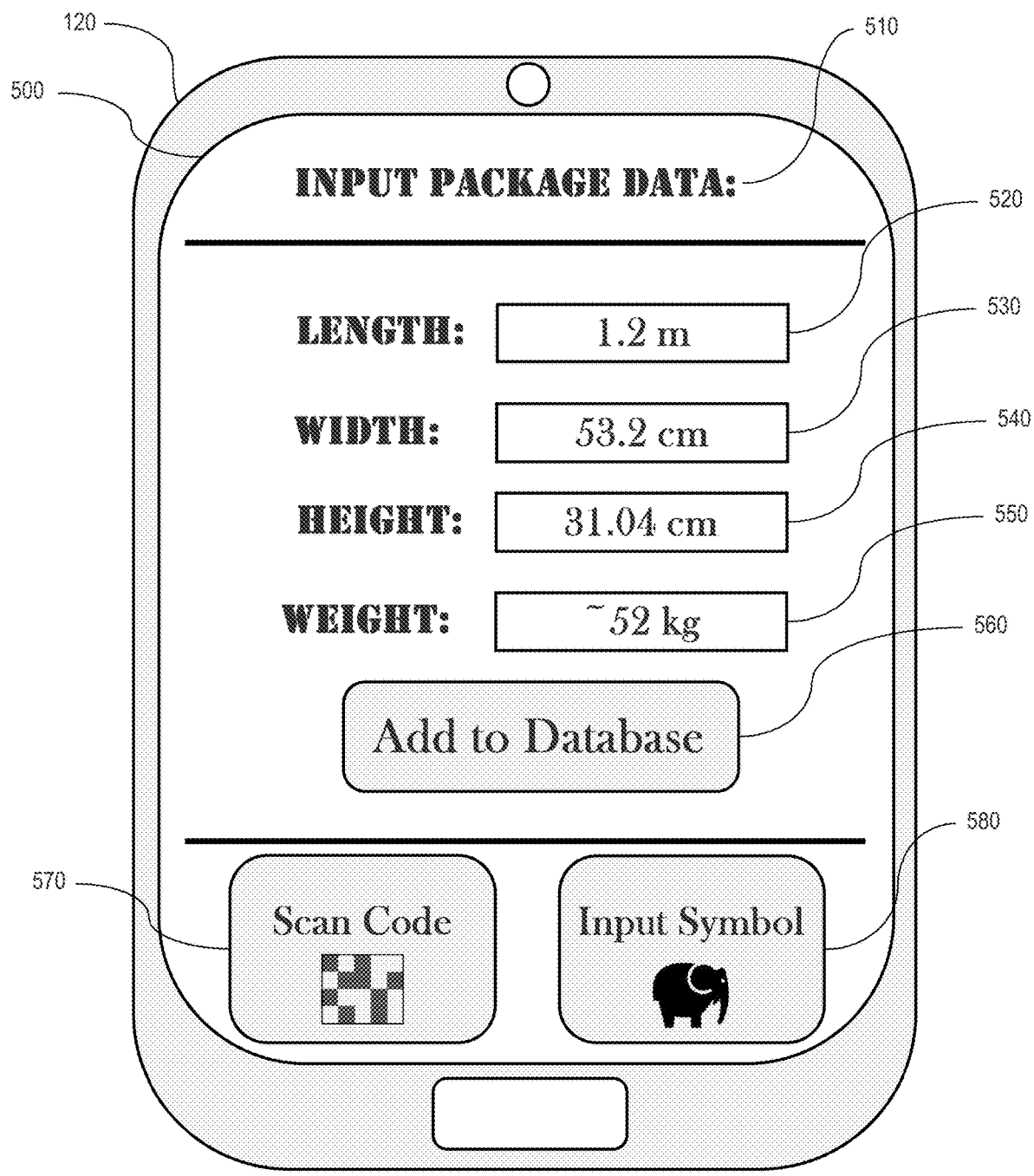
FIG. 5 depicts an example embodiment that may be used in implementing the example process.

FIG. 5 depicts an example embodiment that may be used in implementing the example processes. Specifically, FIG. 5. depicts device 120 being utilized as a user mobile device for the input of measured physical properties of a package. The input of measured data on device 120 may be similar to process steps 210 or 420. Device 120 has a screen 500 which implements a graphical user interface as part of a mobile application running on device 120. The graphical user interface may comprise any information necessary to allow operation of the mobile application by a human management facility operator.

As depicted in FIG. 5, a prompt 510 may be shown on the screen 500 of device 120 to specify that an operator should input package data related to a measured package. Package data as input by the operator may be any physical property of a package as described above. For example, a length field 520 may exist for the input of a measured length of a package. A width field 530 may exist for the input of a measured width of a package. In various embodiments, a field may accept the same type of input or a different type of input as different fields. For example, FIG. 5 shows a user has input a length on meter units and a width in centimeter units. A height field 540 may exist for the input of a measured height of a package. In various embodiments, a field may accept different levels of precision for an input. For example, FIG. 5 shows a user has input a height with a more precise measurement for the height field than the width field.

A weight field 550 may exist for the input of a measured weight of a package. In various embodiments, a user may input an approximate value in a field. For example, FIG. 5 shows a user has used a "~" may to indicate that the user's best estimate of a packages weight is fifty-two kilograms. In various embodiments a user may user a dedicated input button 560 to finalize and send to the package database 110 the package data input at device 120. For example, FIG. 5 shows an "ADD TO DATABASE" button which a user will press on display 500 to indicate to device 120 that the measured dimensions and weight of a package are ready to be sent to the package database for storage.

In various embodiments, a user may use additional functionality built into the mobile application to access already stored package data by scanning or recognizing a symbol, measurement, resource link or other entity attached to a package. For example, a package may arrive at a management facility already having been previously measured at a previous management facility, and the measurement can be accessed to facilitate either of processes 200 or 400. One example of a symbol which may be used to retrieve previously measured data is a QUICK RESPONSE CODE. As shown in FIG. 5, a scan button may be used to signal to device 120 to prepare to scan a code which will allow the device 120 to access previously take measurements of a package.

In various embodiments, physical properties of a device may be assigned measurements by default based on similarity to other packages already stored in the package database 110. For example, if a user determines that a package is of a dimensions and/or weight that is very similar to dimensions and/or weights which correspond to a package grouping, a user may input at device 120 using grouping button 580 a group which the package should be placed into. If precise measurement of the package has not been completed, the package manager 140 may assign to the package data consistent with the package group the package should be placed in. In various embodiments, the package data assigned to the package is a default set of package data specified by a user. In various embodiments, the package data assigned to the package is the mean value of other packages in the package group.

Figure 6A:
FIG. 6A depicts an example embodiment that may be used in implementing the example process.
Figure 6A:

As depicted in FIG. 6A, the package database 110 may store a table 600 of data related to various package data that have been input into the package database. A selection 610 of data in the package database 110 may correspond to properties of a package which is stored at a management facility. For example, FIG. 6A depicts a table 600 in the package database 110 which has stored various package data corresponding to various packages. The package database may store any package data sufficient to perform the processes 200 or 400. For example, a package database may store data values related to an assigned serial number for each package, dimensions and weight for each package, and an indicator for the human-readable symbol of a package group that the package may belong to.

As depicted in FIG. 6A, several packages have the string value "new" in the symbol data field, indicating that the packages have recently arrived at the management facility and have not been assigned to a package group. As depicted in FIG. 6A, several packages have the value "Not Available" or "NA" in the symbol data field, indicating that the packages have not recently arrive but have not yet been assigned to a package group.

Figure 6B:
FIG. 6B depicts an example embodiment that may be used in implementing the example process.
Figure 6B:
Figure 6B:
Figure 6B:
Figure 6B:
Figure 6B:
Figure 6B:
Figure 6B:

FIG. 6B depicts the package database 110 after process step 230 has been performed for grouping packages into various package groups. For example, recently arrived package serial number #1234, having dimensions similar to package serial number #1236 has been assigned to the same package group as package serial number #1236, the "elephant" group. Similarly, package serial number #1237 has also been assigned to the "elephant group" due to a similarity in dimensions.

In various embodiments, grouping 230 of packages may be based on similar weights of packages. For example, as depicted in FIG. 6B, package serial number #1271 has been assigned to the same package group as package serial number #1244, the "hat group." In various embodiments, grouping 230 of packages may be based on a combination of physical properties. For example, as depicted in FIG. 6A, package serial number #1235 has also been assigned to "hat group" as having a similar weight and similar dimensions to package serial number #1244. In various embodiments, if a group is not present having like physical properties to one or more packages, a group may be created for those packages. For example, as depicted in FIGS. 6A and 6B, package serial number #1242 and package serial number #1243 have similar dimensions and weight values to each other, but not to any other packages in package database 110. Therefore, package manager 140 has created a separate group, the "hot dog group" to group the packages.

Figure 7:
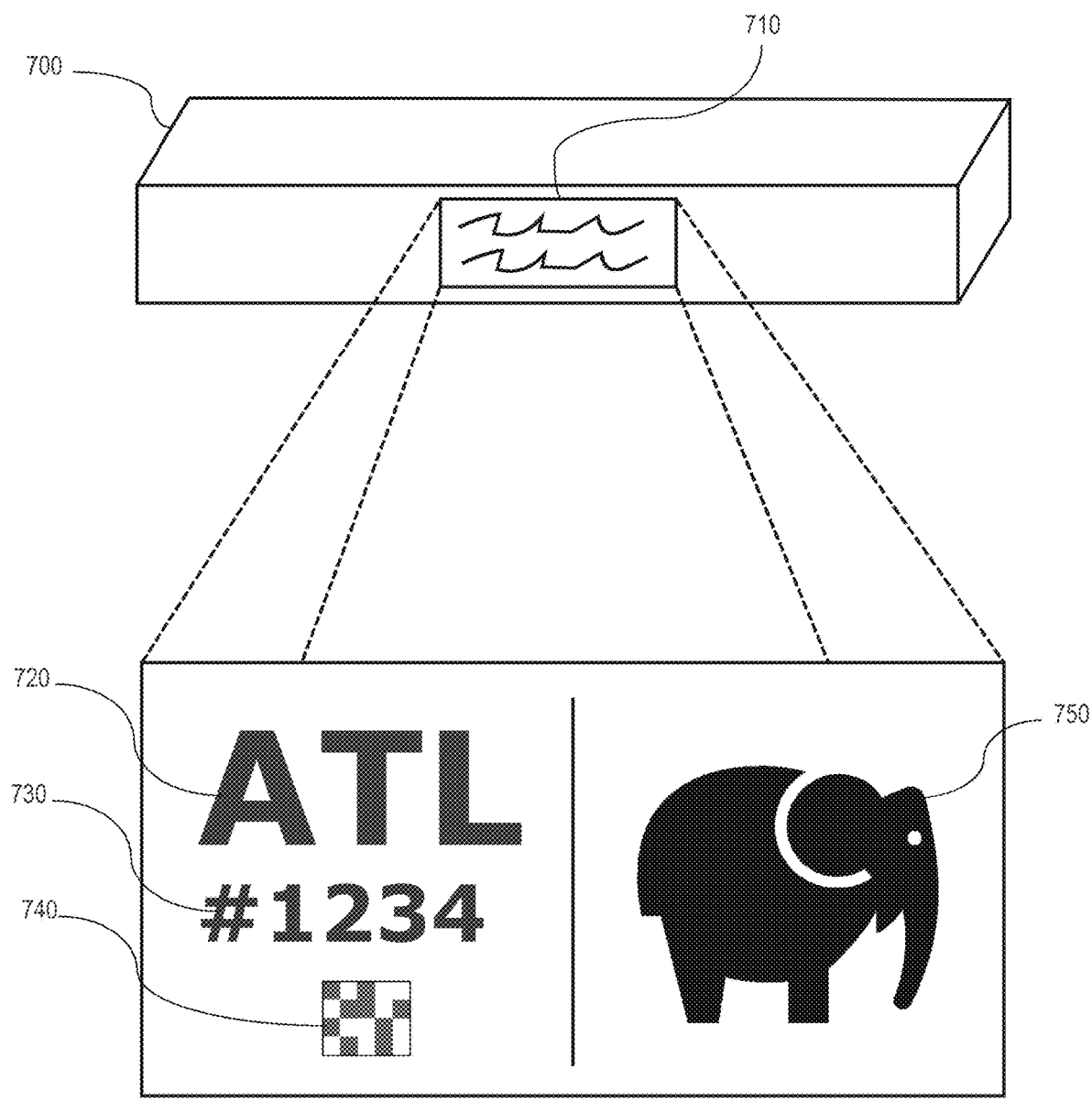
FIG. 7 depicts an example embodiment that may be used in implementing the example process.

In various embodiment, a physical label may be printed which can be affixed to a package. As depicted in FIG. 7, a package 700 has placed thereon a label 710. The label 710 may be any representation or physical object which can convey an aspect or property of a package 700. For example, label 710 comprises a destination indicator 720 indicating the destination to which a package will be delivered commercially. Label 710 also comprises a serial indicator 730 indicating the identifier or serial designation that a package is given. As an additional example, label 740 comprises computer-recognizable symbol 740 which may be any symbol or entity which a computer is capable of reading and/or recognizing. Label 710 also comprises human-recognizable symbol 750, which may indicate a group of the group of packages that a package 700 belongs to. For example, human-recognizable symbol 750 is an elephant, indicating that package 700 belongs to the "elephant" group of package groups.

Figure 8:
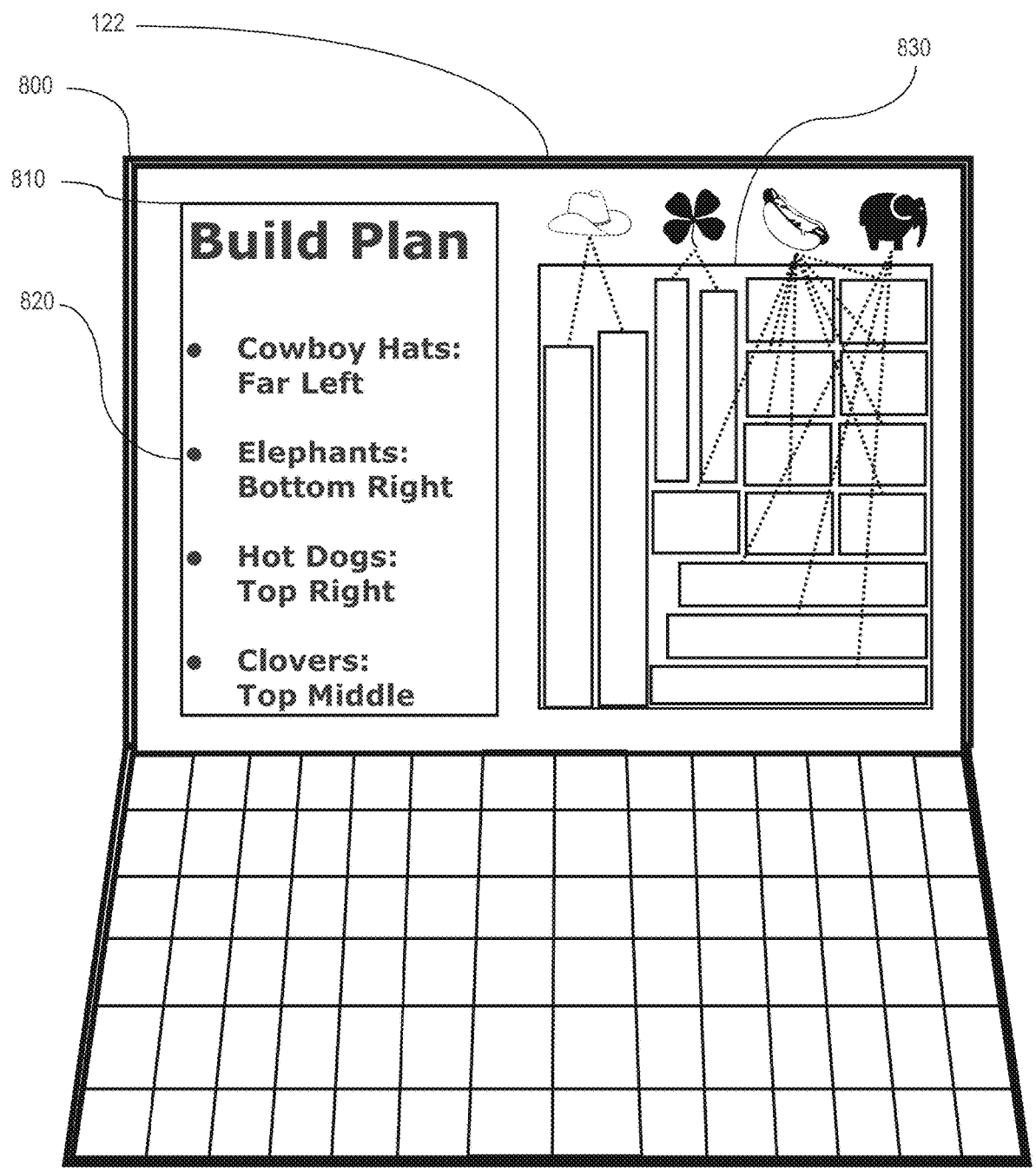
FIG. 8 depicts an example embodiment that may be used in implementing the example process.

Using a computer system, the optimal arrangement of packages in a shipping space can be quickly and easily identified in a build plan which can be easily understood and followed by manual laborers. As depicted in FIG. 8, a build plan may be generated for filling a space with packages from the groups of packages. Package manager 140 may generate the build plan and send the build plan for inspection or execution to a user. For example, FIG. 8 shows device 122 displaying on a screen 800 the generated build plan.

In various embodiments, a build plan is any physical or digital instruction or data which can convey an arrangement of packages. A build plan may be a set of instructions readable by a human. For example, FIG. 8 shows an instructionally worded build plan 810 on the screen 800 of device 122. The build plan may include one or more steps 820 for carrying out a build plan. For example, the instructionally worded build plan 810 specifies which symbolically-recognizable groups should be placed in a particular portion of a shipping container to maximize utilized space in the container for more efficient shipping practices. In various embodiments an instructionally worded build plan include values specifying the number of packages of a symbolically-recognizable group will be placed into a storage container. For example, a build plan may specify in wording that "three elephant group packages will be placed in the bottom right" of a shipping container.

A build plan display 830 may show a user a suggested arrangement of package groups visually. The build plan display may be any picture, symbol, visual display or entity capable of visually conveying to a user the arrangement of packages or package groups within a shipping container. In various embodiments, the build plan display 830 may show symbols corresponding to the human-recognizable symbols making up the package groups to help a human user identify the arrangement specified in the build plan. In various embodiments, the build plan display 830 may be a two dimensional or three-dimensional figure displayed to help a human user identify the arrangement specified in the build plan.

Figure 9:
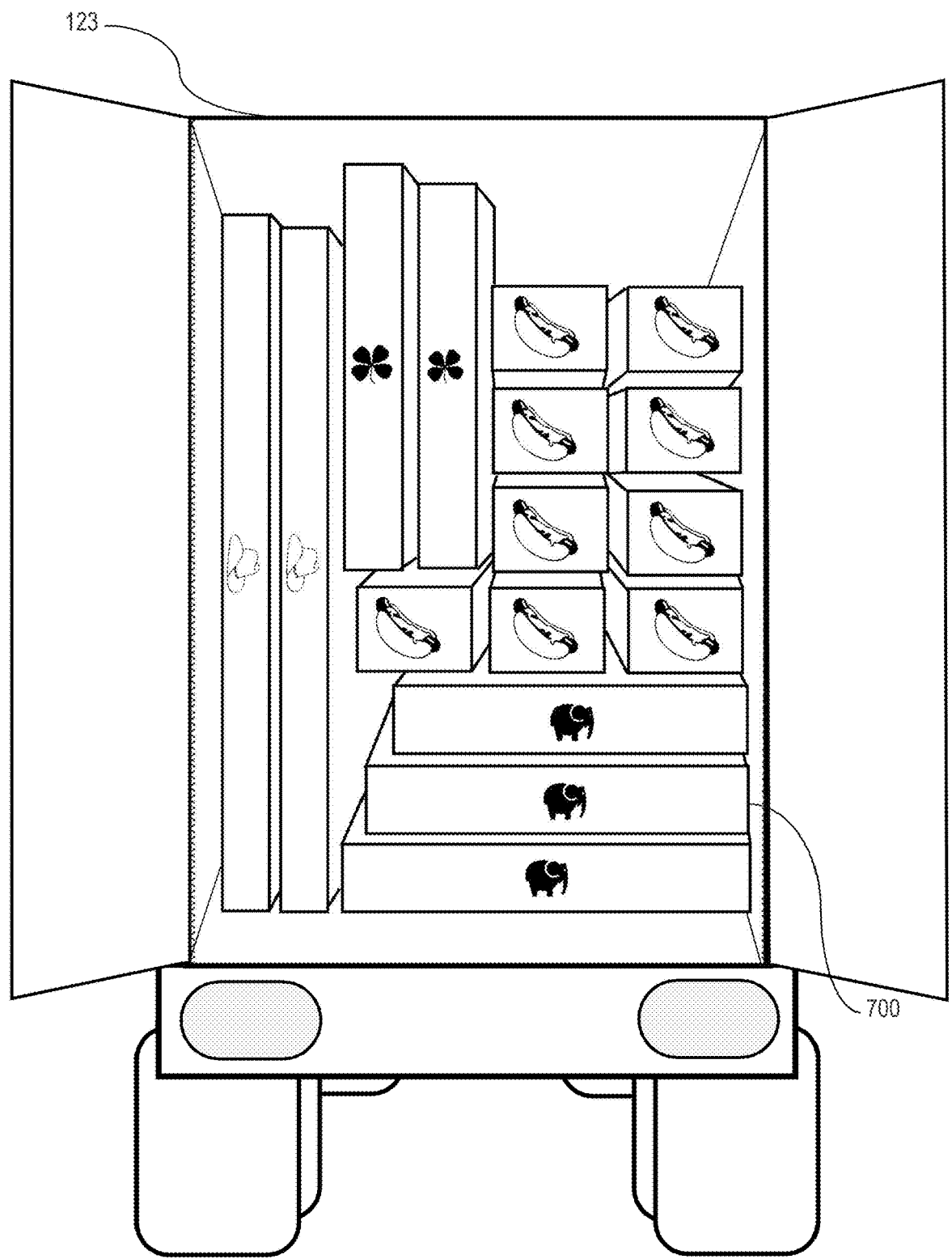
FIG. 9 depicts an example embodiment that may be used in implementing the example process.

As depicted in FIG. 9, a build plan may been followed to load packages, including package 700 into a commercial vehicle such as commercial vehicle 123.

Implementation Mechanisms

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
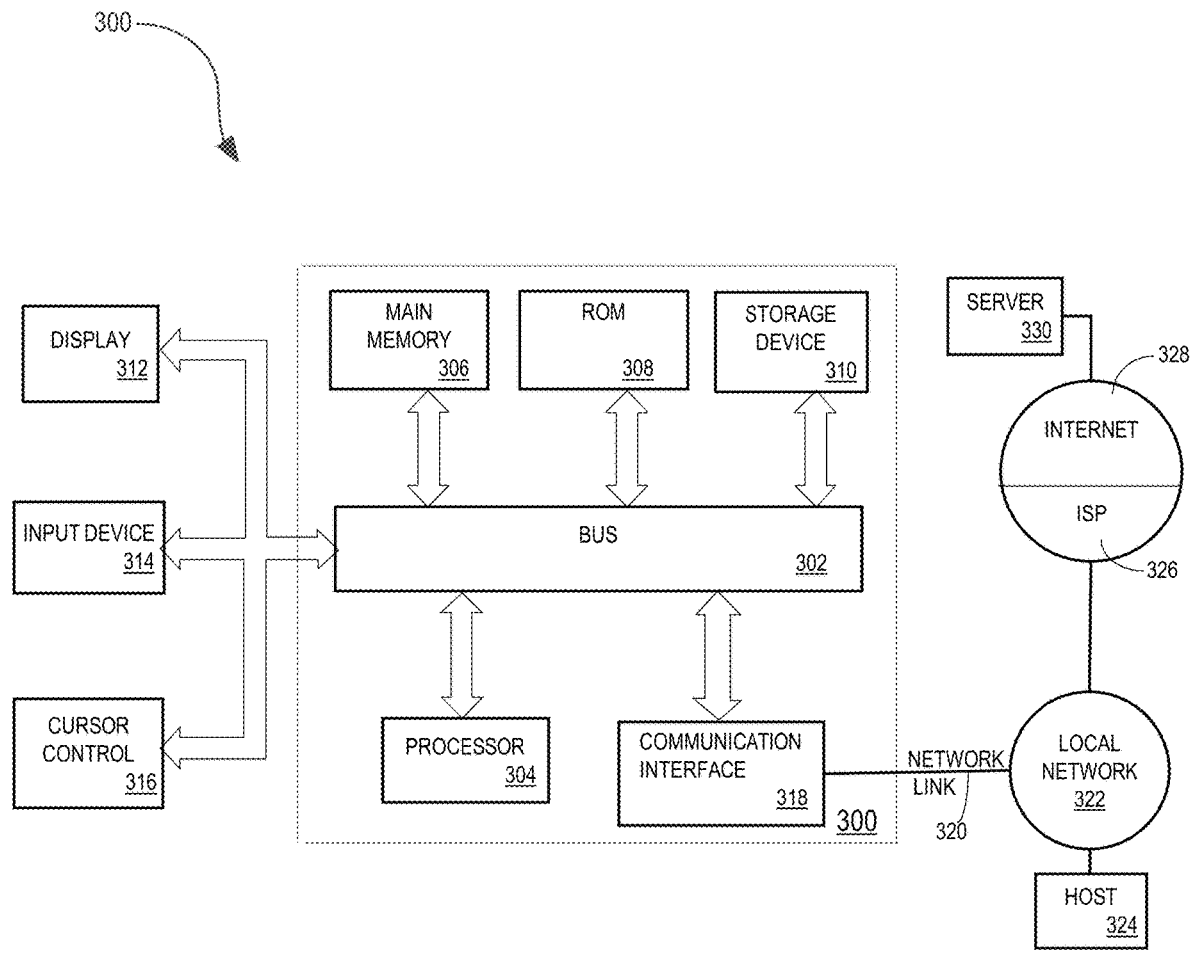
FIG. 3 depicts an example general purpose computer system that may be used to implement aspects of an embodiment.

FIG. 3 is a block diagram that depicts an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis, for example, x, and a second axis, for example, y, that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
receiving, at a computer system, package data specifying physical attribute values for a first plurality of objects which will be transported commercially;
sending, by the computer system, the package data to a package database, the package database storing the package data;
grouping, by the computer system, based on stored package data in the package database, the first plurality of objects into two or more package groups, each package group of the two or more package groups including a set of packages of the first plurality of objects;
wherein grouping the objects is based on values of one or more target physical attributes for each object of the first plurality of objects, wherein each of the two or more package groups comprises objects having values, for the one or more target physical attributes, that are associated with said each package group;
associating, by the computer system, a human-recognizable symbol with each package group of the two or more package groups, wherein the human-recognizable symbol for each package group is visually distinguishable from the human-recognizable symbols for every other package group in the two or more package groups;
using first information defining volume specifications for package storage and second information identifying a second plurality of objects to be placed in the package storage, the second plurality of objects including one or more objects in each of the two or more package groups: generating, by the computer system, a package build plan that specifies a physical arrangement of at least the second plurality of objects, the physical arrangement being configured to occupy a target percentage of the package storage volume;
wherein the package build plan identifies objects in each of the two or more package groups using at least the human-recognizable symbol for said each package group; and
causing display of the package build plan on a graphical user interface.

2. The computer-implemented method of claim 1, wherein:

the package data further comprises content data specifying contents of an object which will be transported commercially;

associating a human-recognizable symbol with each package group of the two or more package groups is based on the content data of said each package group.

3. The computer-implemented method of claim 1, wherein:

the package data further comprises supplier data specifying an original supplier of an object which will be transported commercially;

associating a human-recognizable symbol with each package group of the two or more package groups is based on the supplier data of said each package group.

4. The computer-implemented method of claim 1, further comprising:

associating, by the computer system, a computer-recognizable symbol with each package group of the two or more package groups;

generating a physical shipping label to be attached to an object in a particular package group which will be transported commercially, the particular package group being associated with a particular computer-recognizable symbol and a particular human-recognizable symbol, the physical shipping label comprising the particular computer-recognizable symbol and the particular human-recognizable symbol.

5. The computer-implemented method of claim 1, further comprising:

measuring, by an electronic measurement system, the first plurality of objects;

generating physical attribute values for the first plurality of objects based on the measurements of the electronic measurement system;

wherein the stored package data in the package database comprises the generated physical attribute values.

6. The computer-implemented method of claim 1, wherein:

the physical attribute values includes package weight values;

grouping the first plurality of objects is based, at least in part, on the package weight values;

the physical arrangement is further configured to place objects with a higher package weight value below objects with a lower package weight value.

7. The computer-implemented method of claim 1, further comprising:

determining that a particular package group identified in the package build plan is unavailable;

identifying, by the computer system, one or more substitute package groups having physical attributes similar to the particular package group;

generating, by the computer system, a substitute package build plan that specifies a substitute physical arrangement of objects that includes the one or more substitute package groups instead of the particular package group.

8. One or more non-transitory computer-readable media storing instructions that, when executed by one or more processors, cause:

receiving, at a computer system, package data specifying physical attribute values for a first plurality of objects which will be transported commercially;

sending, by the computer system, the package data to a package database, the package database storing the package data;

grouping, by the computer system, based on stored package data in the package database, the first plurality of objects into two or more package groups, each package group of the two or more package groups including a set of packages of the first plurality of objects;

wherein grouping the objects is based on values of one or more target physical attributes for each object of the first plurality of objects, wherein each of the two or more package groups comprises objects having values, for the one or more target physical attributes, that are associated with said each package group;

associating, by the computer system, a human-recognizable symbol with each package group of the two or more package groups, wherein the human-recognizable symbol for each package group is visually distinguishable from the human-recognizable symbols for every other package group in the two or more package groups;

using first information defining volume specifications for package storage and second information identifying a second plurality of objects to be placed in the package storage, the second plurality of objects including one or more objects in each of the two or more package groups: generating, by the computer system, a package build plan that specifies a physical arrangement of at least the second plurality of objects, the physical arrangement being configured to occupy a target percentage of the package storage volume;

wherein the package build plan identifies objects in each of the two or more package groups using at least the human-recognizable symbol for said each package group; and causing display of the package build plan on a graphical user interface.

9. The non-transitory computer-readable media of claim 8, wherein:

the package data further comprises content data specifying contents of an object which will be transported commercially;

associating a human-recognizable symbol with each package group of the two or more package groups is based on the content data of said each package group.

10. The non-transitory computer-readable media of claim 8, wherein:

the package data further comprises supplier data specifying an original supplier of an object which will be transported commercially;

associating a human-recognizable symbol with each package group of the two or more package groups is based on the supplier data of said each package group.

11. The non-transitory computer-readable media of claim 8, further storing instructions that, when executed by the one or more processors, cause:

associating, by the computer system, a computer-recognizable symbol with each package group of the two or more package groups;

generating a physical shipping label to be attached to an object in a particular package group which will be transported commercially, the particular package group being associated with a particular computer-recognizable symbol and a particular human-recognizable symbol, the physical shipping label comprising the particular computer-recognizable symbol and the particular human-recognizable symbol.

12. The non-transitory computer-readable media of claim 8 further storing instructions that, when executed by the one or more processors, cause:

measuring, by an electronic measurement system, the first plurality of objects;

generating physical attribute values for the first plurality of objects based on the measurements of the electronic measurement system;

wherein the stored package data in the package database comprises the generated physical attribute values.

13. The non-transitory computer-readable media of claim 8, wherein:

the physical attribute values includes package weight values;

grouping the first plurality of objects is based, at least in part, on the package weight values;

the physical arrangement is further configured to place objects with a higher package weight value below objects with a lower package weight value.

14. The non-transitory computer-readable media of claim 8, further storing instructions that, when executed by the one or more processors, cause:

determining that a particular package group identified in the package build plan is unavailable;

identifying, by the computer system, one or more substitute package groups having physical attributes similar to the particular package group;

generating, by the computer system, a substitute package build plan that specifies a substitute physical arrangement of objects that includes the one or more substitute package groups instead of the particular package group.

15. The computer-implemented method of claim 1, wherein the package storage volume is irregularly shaped.

16. The computer-implemented method of claim 1, wherein the target percentage of the package storage volume is less than 100% of the package storage volume.

17. The computer-implemented method of claim 1, wherein the package build plan is configured to cause a particular amount of unused space around edges of the package storage volume.

18. The computer-implemented method of claim 1, further comprising, after generating the package build plan:

receiving, at the computer system, second package data specifying physical attribute values for a third plurality of objects which will be transported commercially;

responsive to receiving the second package data:

determining, by the computer system and based on the second package data, that particular one or more objects of the third plurality of objects fill an unused space within the target percentage of the package storage volume resulting from the physical arrangement indicated in the package build plan; and responsive to determining that the particular one or more objects of the third plurality of objects fill the unused space, generating a second package build plan that specifies a second physical arrangement that includes the particular one or more objects.

19. The computer-implemented method of claim 1, wherein:

the one or more target physical attributes comprises one or more attributes defining object volume and one or more attributes defining travel for an object, the one or more attributes defining travel comprising one or more of: geographical origin, geographical destination, miles travelled, or time of packaging;

wherein each of the two or more package groups comprises objects having a unique combination of values, among the two or more package groups, for (a) the one or more attributes defining object volume and (b) the one or more attributes defining travel.

20. The computer-implemented method of claim 1, further comprising:

receiving, at the computer system, second package data specifying a particular object with an identifier of a particular package group of the two or more package groups;

automatically associating the particular object with default values for the one or more target physical attributes based, at least in part, on values of the one or more target physical attributes of other objects in the particular package group.

\* \* \* \* \*